United States Patent [19]

Swindle

[11] Patent Number: 5,671,659
[45] Date of Patent: Sep. 30, 1997

[54] FOOD SKEWER TOOL

[76] Inventor: Martin Van Buren Swindle, 651 Parkway, Suite 11, Gatlinburg, Tenn. 37738

[21] Appl. No.: 498,422

[22] Filed: Jul. 5, 1995

[51] Int. Cl.[6] .......................... A47J 43/00; A22C 11/00; A23P 1/00
[52] U.S. Cl. .................. 99/419; 99/646 R; 227/141; 227/117; 227/120; 294/5.5; 294/61; 426/91; 426/134
[58] Field of Search .................... 99/419–421, 494, 99/355, 646 R; 227/141, 120, 117, 100; 294/5.5, 61; 426/91, 134, 421; D7/683

[56] References Cited

U.S. PATENT DOCUMENTS

| | | | |
|---|---|---|---|
| 2,617,675 | 11/1952 | Janicke | 294/5.5 |
| 2,963,147 | 12/1960 | Stagner | 206/46 |
| 3,339,478 | 9/1967 | Crow | 99/355 |
| 3,757,985 | 9/1973 | Clarke | 294/68.24 |
| 4,025,032 | 5/1977 | O'Neil et al. | 227/141 |
| 4,062,108 | 12/1977 | Cottrell | 99/494 X |
| 4,138,050 | 2/1979 | McKinney et al. | 227/120 X |
| 4,141,578 | 2/1979 | Zinder | 294/61 |
| 4,204,627 | 5/1980 | Kutzner et al. | 227/81 |
| 4,232,811 | 11/1980 | Cottrell et al. | 227/117 |
| 4,363,158 | 12/1982 | Gerdlund | 17/1 S |
| 4,645,113 | 2/1987 | Webber | 227/155 X |
| 4,924,768 | 5/1990 | Jay | 99/419 X |
| 5,056,841 | 10/1991 | Yong | 294/5.5 |
| 5,069,117 | 12/1991 | Schlessel | 99/419 |
| 5,088,782 | 2/1992 | Scott | 294/61 X |
| 5,323,692 | 6/1994 | Grzywna | 99/419 X |
| 5,403,051 | 4/1995 | Watkins | 294/5.5 |
| 5,501,338 | 3/1996 | Preston | 294/61 X |

Primary Examiner—Timothy F. Simone
Attorney, Agent, or Firm—Luedeka, Neely & Graham, P.C.

[57] ABSTRACT

A food skewering tool is used to insert a skewer into a food item, such as an apple. The tool includes a barrel having an axial bore for receiving and guiding the skewer, and a striker element which applies force to the skewer to drive it into the food item. The striker element may include a detent that receives the skewer and prevents slippage when the skewer is being driven. The length of the barrel and the length of the skewer combine to establish the depth that the skewer will penetrate into the food item.

12 Claims, 1 Drawing Sheet

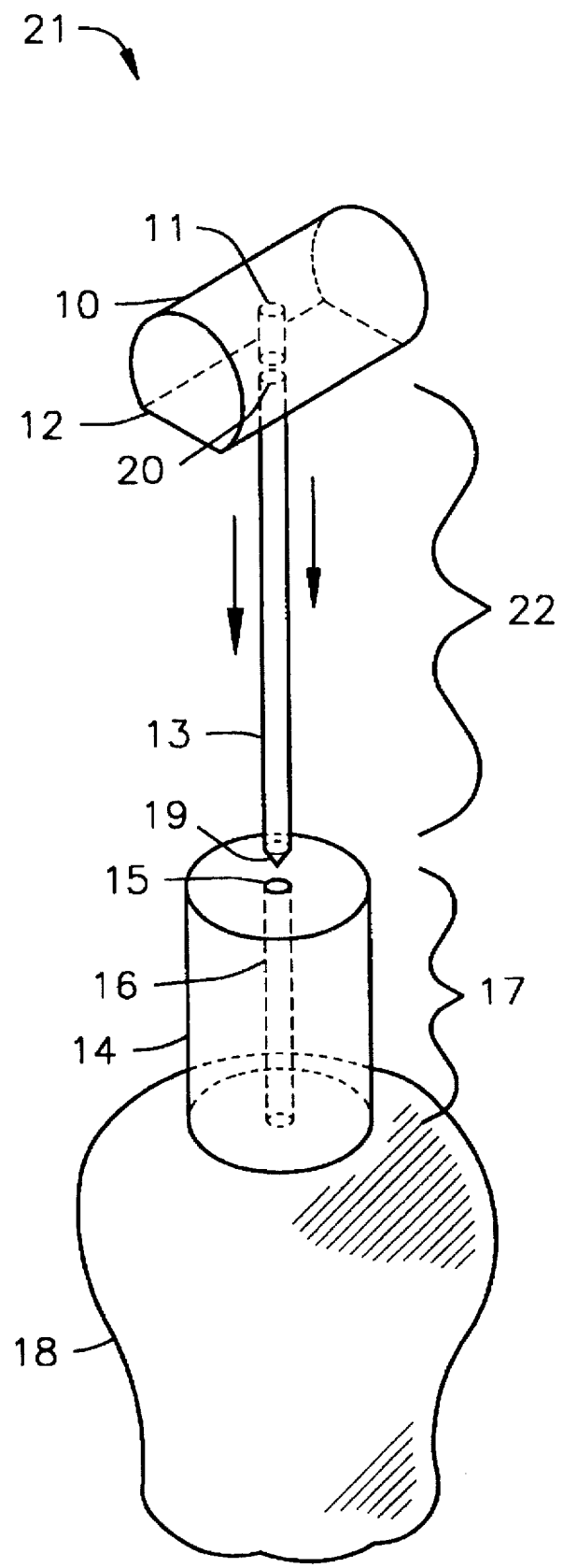

FOOD SKEWER TOOL

TECHNICAL FIELD

The present invention relates to an apparatus for skewering a food item. More particularly, the present invention relates to a simple device for quickly, safely, and conveniently penetrating food items with a skewer at a uniform depth.

BACKGROUND OF THE INVENTION

Skewers have long been used as handles for various foods such as corndogs and candied apples. The skewer functions primarily to support the food item during preparation and consumption. In use, the skewer acts as a handle to avoid danger to the hands during preparation of the food and to protect against soiling of the hands during consumption of the food item.

The insertion of these skewers into the food item has presented various problems in terms of safety and efficiency. The safety problems arise as a result of the small surface area at the penetration end of the skewer (i.e., the penetration end of the skewer is relatively sharp), and the method of applying force to the skewer in the insertion process. While a sharp skewer can be inserted into a food item with greater ease, it is also easy for the skewer to be inadvertently inserted into the user during the skewering process. Efficiency problems result from the fact that burdensome safety procedures must be utilized during the skewering process to compensate for safety deficiencies inherent to the skewering device being used. Efficiency may be further compromised due to non-uniform skewering methods. The present invention provides a method and apparatus for the insertion of a skewer into the food item with relative ease, safety, and efficiency.

Many of the food items that are skewered are usually perishable and therefore are rarely prepared by machines in factory-type environments. Instead, the foods are generally manually skewered on a small production, as-need basis by the vendors of the food items. These vendors operate at carnivals, stadiums, etc., where large volumes of candied apples, corn, corndogs, and other skewered food items are sold. To meet these demands, the vendor must manually skewer the food items at a fast rate. This practice causes several efficiency problems such as damaged foods due to incorrect insertion of the skewer. It would be desirable to provide a device and method for skewering food items that provide efficiency and uniformity in the skewering process.

When foods are manually skewered at a high rate of speed, the risk of injury to the vendor increases. Some food items are difficult to pierce because of their firm texture. For this reason, the skewers are usually designed with a penetration end having a reduced surface area to aid in the skewering process. This penetration end, coupled with the firm pressure which must be administered in the insertion process, present a potential risk of injury to the vendor. It would be desirable to provide a device and method for skewering of food items that would replace or eliminate these potential risks of injury.

The prior art teaches a variety of skewering methods and devices, most of which are food item specific. U.S. Pat. No. 2,617,675 to Janicke discloses a means for holding articles having a sticky or easily damaged surface. This device includes a pair of holding members that are inserted at opposite sides of the article and provide surfaces for grasping the article by the hand of the user. Although these holding members do not present a high risk of injury, they do require an intricate installation process and are therefore not efficiently installed. These holding members also do not provide an adequate distance between the article and the hands during consumption.

U.S. Pat. No. 2,963,147 to Stagner discloses a means for facilitating the handling of a delicate, confectioned food item. This device contains a tubular tapered skewer which is inserted into one side of the confection. Within the tapered skewer is a telescoping handle which is extended during the consumption of the confection. The installation of the skewer in Stagner requires that the tubular tapered skewer be installed first. The telescoping handle is then inserted through the tapered opening and a base is attached to the narrow end of the telescoping handle. This installation process presents many problems in terms of efficiency for the vendor who is preparing skewered confections on an as-need basis.

U.S. Pat. No. 3,339,478 to Crow discloses a cooking skewer having a tubular end portion and a pointed end portion. The tubular end portion is inserted into a skewer carrying handle and bite-size particles of food are inserted onto the pointed end portion of the skewer.

The Crow cooking skewer is inoperable for the skewering of most food items. The Crow skewer fails to account for safety hazards inherent to the skewering process, and fails to provide a means for limiting the depth to which the skewer can be inserted into the bite-size particles of food.

U.S. Pat. No. 4,363,158 to Gerdlund discloses a device for installing skewers into the end of wieners. Because Gerdlund is confined to the skewering of wishers and does not account for regulation of the skewer insertion depth, it is ill-suited for use in skewering most food items.

U.S. Pat. No. 4,025,032 to O'Neil discloses a device for skewering a soft food articles with a coiled paper skewer. Due to the pliant nature of the paper skewer, this apparatus utilizes a cylindrical supporting jacket to prevent the coiled paper skewer from bending during insertion.

The O'Neil device is used by physically bringing the soft food article to the device and applying a downward pressure on the soft food article while the food is contact with the sharp end of the skewer. In this manner, the food item is impaled on the skewer. O'Neil provides no protection to the user should the soft food article collapse or slip during skewering.

Thus there is a need for a food skewering device and method that is safe, efficient, consistent, and can be used to skewer a variety of food item types.

SUMMARY OF THE INVENTION

The present invention solves the shortcomings of the prior art by providing a skewering apparatus that utilizes a barrel in combination with a striker for guidance and easy insertion of the skewer. The present invention alleviates the need to hold the food during the insertion process, thereby reducing the risk of impalement of the user. Further, the present apparatus is easily manufactured, efficient in its use, portable, and requires no high maintenance or complicated parts.

In accordance with the present invention, a skewering apparatus for penetrating a food item with an elongated skewer, containing a length, a cross-sectional dimension, a penetration end, and a driving end, is disclosed. The food skewering apparatus includes a barrel having an axial bore with a cross-sectional dimension slightly larger than the cross-sectional dimension of the skewer. The inner surface of the axial bore guides the skewer during the skewering process. A striker is also used for inserting the penetration end of the skewer into the food item when it is driven while in contact with the driving end of the skewer.

In one embodiment, the length of the barrel functions in combination with the length of the skewer to restrict the depth of penetration of the skewer into the food item. This insertion length can be regulated by either varying the length of the skewer or the barrel.

In another embodiment of the invention, the striker has at least one generally flat surface for a flush meeting of the striker and the top of the barrel during insertion. In another embodiment, the striker contains a detent on one surface of the striker. This detent has a cross-sectional dimension slightly larger than the cross-sectional dimension of the skewer. The driving end of the skewer is inserted into the detent, and the detent releasably secures the skewer in position during the insertion process. In another embodiment of the invention, the detent is located on the generally flat surface of the invention. In a further embodiment of the invention, the barrel and the striker are cylindrical in shape.

Since the skewering apparatus seeks to drive the skewer into the food instead of the food item onto the skewer, it reduces the risk of impalement of the user during the skewering process. The use of the apparatus also isolates the hands from the penetrating end of the skewer, thereby reducing the risk of impalement.

The skewering apparatus increases efficiency. The unit is designed to allow the skewering of a food item without handling the food. This apparatus allows the user to skewer many food items in repetition with ease and without fear of injury.

The skewering apparatus increases the quality of the food item. As mentioned previously, the food item is not handled during the skewering process, thereby reducing risk of food contamination. The skewering apparatus also produces a uniform product by controlling the depth of insertion of the skewer into the food item. Further, the barrel controls the insertion point of the skewer, thereby preventing the skewer from being inserted in an undesirable position in the food item.

The skewering apparatus presents a low cost, low maintenance means for the skewering of food items. It can be produced in a relatively simple manufacturing process with low cost and with readily available materials. Further, the skewering apparatus contains no complex parts, nor does it contain parts that require routine maintenance.

BRIEF DESCRIPTION OF THE DRAWINGS

The present invention may best be understood by reference to the Detailed Description of the Preferred Embodiment of the invention when considered in conjunction with the single drawing which provides a perspective view of a food skewering apparatus in accordance with the invention.

DETAILED DESCRIPTION OF THE PREFERRED EMBODIMENT

Referring now to the Drawings in which like reference characters designate like or corresponding parts throughout the several views, there is shown in the drawing a perspective view of a skewering apparatus 21 for skewering food items such as an apple 18 with a skewer 13. As illustrated, the apparatus 21 includes a barrel 14 having an axial bore 15 with cross-sectional dimension slightly larger than the cross-sectional dimension of the skewer 13. The axial bore 15 has an inner surface 16 extending throughout the length of the barrel 14. Further, the barrel 14 contains a predetermined length 17 which acts in combination with the length 22 of the skewer 13 to limit the depth at which the skewer 13 penetrates the apple 18. For example, for a barrel length 17 of five inches, a detent 11 depth of 1 inch, and a skewer length 22 of 10 inches, the depth of skewer penetration into the apple 18 will be four inches. If the skewer length 22 is increased to eleven inches, the depth of penetration will be five inches.

A striker 10 is provided to enable the user to safely and comfortably apply force to the skewer 13 for insertion. This striker 10 is separate from the barrel 14 and is positioned in contact or in close proximity with the driving end 20 of the skewer 13. In a preferred embodiment of the invention, the striker 10 is cylindrical so as to conform to the user's hand. In another embodiment, the striker 10 is formed with finger grips. Preferably, the striker 10 contains a detent 11 having a cross-sectional dimension slightly larger than the cross-sectional dimension of the driving end 20 of the skewer 13. The detent 11 receives the driving end 20 of the skewer 13 and releasably secures the skewer during the insertion process. The striker 10 also contains a generally flat surface 12 which facilitates a flush contact between the barrel 1 4 and the striker 10 during the skewering process.

In operation, the barrel 14 is positioned in close proximity to the apple 18. A skewer is placed in the bore 15 penetration end 19 first. The inner surface 16 of the bore 15 acts as a guide for the skewer 13 during insertion. The driving end 20 of the skewer 13 is inserted into the detent 11 of the striker 10. With the skewer 13 inserted into the bore 15 so that the penetration end 19 is in contact with the apple 18, and with the driving end 20 of the skewer 13 secured in the detent 11 of the striker 10, the skewer is now in position to be inserted into the apple 18. A force is applied to the striker 10 in a direction generally indicated by the arrows, causing the skewer to penetrate the apple 18. The force is maintained until the flat surface 12 of the striker 10 makes contact with the barrel 14, at which point the insertion is complete and the striker 10 and barrel 14 are removed.

It will be understood that the barrel 14 eliminates the need for the user to handle the food item during skewering, thereby reducing the risk of impalement of the user's hand during the skewering process. In this manner, the skewer 13 is brought to the apple 18, thereby enabling the user to skewer a large number of apples with speed and uniformity. The barrel 14 also enables the user to exert a force on the apple 18 to prevent movement of the apple 18 during skewering.

In a preferred embodiment, the barrel 13 and striker 10 are cylindrical so as to conform to the user's hand. However, it will be understood that the barrel 14 and the striker 10 may be fabricated in other shapes, including rectangular, square, or triangular. The barrel 14 and striker 10 may be fabricated from a variety of materials, but are preferably fabricated from wood or plastic. The axial bore 15 and the inner surface 16 have cross-sectional dimensions that are preferably round in shape but may be of any general shape as to accommodate the dimensions of the skewer 13. It is preferable that the inner surface 16 of the axial bore 15 contain roughly the same cross-sectional dimension as the axial bore 15 but it is understood that the inner surface 16 could have any general cross-sectional dimension, provided that the cross-sectional dimension is slightly larger that the skewer 13. The preferred embodiment of the striker 10 contains a flat surface 12 and a detent 11. However, it is understood that these features are not necessary, and the invention may be of any particular shape.

In a preferred embodiment, the skewer 13 is round in shape containing a penetration end 19 with a reduced surface area to facilitate easier insertion. Although a round skewer 13 is illustrated, it will be understood that the skewer 13 may possess other cross-sectional geometries, including flat, square and triangular cross-sections. In a preferred embodiment the skewer 13 is made of wood or plastic, but may be made of paper, metal, or any other suitable material.

It is contemplated, and will be apparent to those skilled in the art from the foregoing specification and drawings that modifications and/or changes may be made in the embodiments of the invention. Accordingly, it is expressly intended that the foregoing are illustrative of preferred embodiments only, not limiting thereto, and that the true spirit and scope of the present invention to be determined by reference to the appended claims.

What is claimed is:

1. A skewering apparatus for penetrating a food item with an elongated skewer having a length, a cross-sectional dimension, a penetrating end, and a driving end, the apparatus comprising:

a barrel having an axial bore of cross-sectional dimension larger than the cross-sectional dimension of the skewer, said bore having an inner surface for guiding the skewer;

wherein the skewer is positioned within said bore and guided by said inner surface during skewering of the food item so that the penetration end only contacts the food item; and a striker for inserting the penetration end of the skewer into the food item when said striker is in driving contact with the driving end of the skewer.

2. The apparatus of claim 1 wherein said barrel comprises a length that functions in combination with the length of the skewer to restrict the depth of penetration of the skewer into the food item.

3. The apparatus of claim 1 wherein said striker comprises a generally flat surface for flush contact with said barrel.

4. The apparatus of claim 1 wherein said striker comprises a detent of cross-sectional dimension larger than the cross-sectional dimension of the skewer for releasably supporting the driving end of the skewer.

5. The apparatus of claim 4 wherein said detent is positioned on the generally flat surface of said striker.

6. The apparatus of claim 4 wherein said barrel and striker are cylindrical.

7. A skewering apparatus for penetrating an apple with an elongated skewer having a length, a cross-sectional dimension, a penetrating end, and a driving end, the apparatus comprising:

a barrel having an axial bore of cross-sectional dimension larger than the cross-sectional dimension of the skewer, said bore having an inner surface for guiding the skewer;

wherein the skewer is positioned within said bore and guided by said inner surface during skewering of the apple so that the penetration end only contacts the apple; and a striker for inserting the penetration end of the skewer into the apple when said striker is in driving contact with the driving end of the skewer.

8. The apparatus of claim 7 wherein said barrel comprises a length that functions in combination with the length of the skewer to restrict the depth of penetration of the skewer into the apple.

9. The apparatus of claim 7 wherein said striker comprises a generally flat surface for flush contact with said barrel.

10. The apparatus of claim 7 wherein said striker comprises a detent of cross-sectional dimension larger than the cross-sectional dimension of the skewer for releasably supporting the driving end of the skewer.

11. The apparatus of claim 10 wherein said detent is positioned on the generally flat surface of said striker.

12. The apparatus of claim 10 wherein said barrel and striker are cylindrical.

* * * * *